United States Patent [19]

Maslov

[11] 3,805,648

[45] Apr. 23, 1974

[54] ARRANGEMENT FOR DEBURRING THE EDGES OF A MOVING METAL BAND

[76] Inventor: Alexandr Stepanovich Maslov, ulitsa Nvanovskaya 16, kv. 6, Zaporozhie, U.S.S.R.

[22] Filed: Jan. 19, 1973

[21] Appl. No.: 325,220

[52] U.S. Cl. .......................... 83/3, 83/745, 90/24 F
[51] Int. Cl. ............................................... B26d 3/00
[58] Field of Search ......... 83/3, 743, 745, 914, 425; 90/24 F

[56] References Cited
UNITED STATES PATENTS

| | | | |
|---|---|---|---|
| 3,377,896 | 4/1968 | De Corta | 83/3 |
| 3,680,441 | 8/1972 | Parker, Sr. | 83/3 X |
| 3,724,304 | 1/1972 | Persson | 83/3 |

Primary Examiner—Willie G. Abercrombie
Attorney, Agent, or Firm—Eric H. Waters

[57] ABSTRACT

The arrangement for deburring the edges of a moving metal band is designed essentially for deburring narrow metal strips or bands.

The frame of the arrangement mounts cutting tools, guides to direct the band into the cutting zone and a mechanism for adjusting the cutting tools in relation to the height of the burrs, and is made in the form of a yoke adapted to be mounted on the band so that the latter serves as a supporting element for the whole deburring arrangement, the frame and the band being capable of moving relatively to each other.

This enables the deburring arrangement to be mounted on the band very quickly and to remove burrs from the band edges irrespective of band position and tension.

9 Claims, 5 Drawing Figures

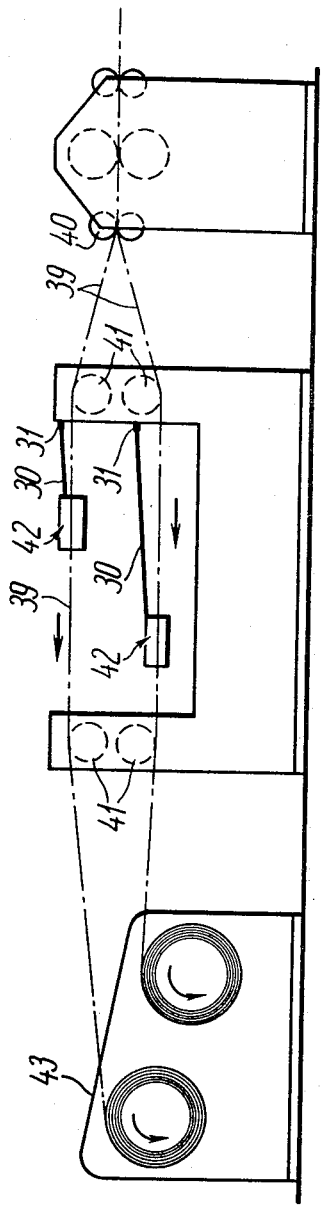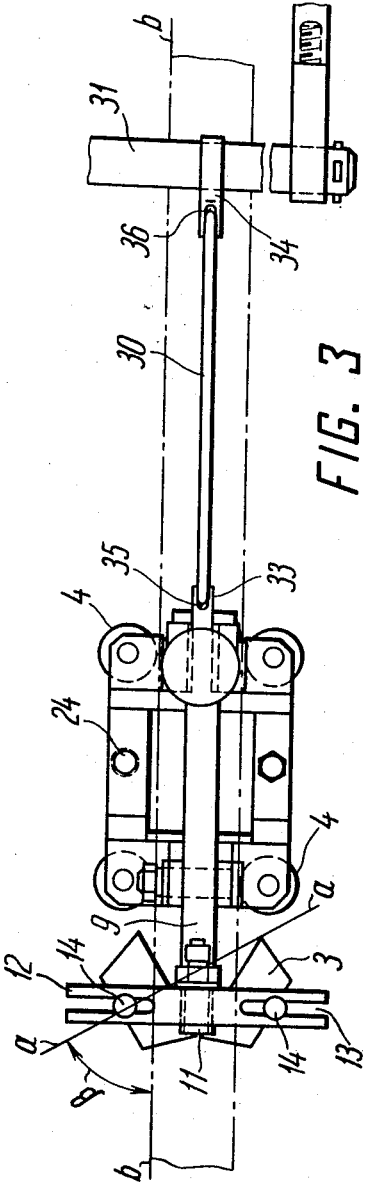

ARRANGEMENT FOR DEBURRING THE EDGES OF A MOVING METAL BAND

The invention relates to arrangements for deburring the edges of moving metal bands, for example, such as those employed in rotary slitting of a metal strip into bands.

The invention may be used with particular advantage for removing burrs in slitting coiled electrical steel into bands 10 – 50 mm wide intended for production of transformer core laminations or for use in radio and instrument manufacture and in mechanical engineering.

Known in the art is an arrangement for deburring a metal band during the process of metal strip slitting.

The aforementioned arrangement has floating carriages held to a bed by guideways located on said bed across the direction in which the band moves. Each carriage has two rests with cutting tools, slotted inserts for damping vertical oscillations of the band moving under tension, and guides to direct the band into the cutting zone.

Each pair of rests is mounted on the carriage so as to ensure simultaneous removal of burrs from the two edges of the moving band.

However, adjustment of the cutting tools to the desired depth of cut is made separately on each rest by the use of a mechanism for setting the cutting tools in respect of the burr height. Therefore it is very difficult to position the cutting tools at the same level and effect uniform deburring of each band edge to the same height.

To deburr several bands at different height positions, the guideways of the floating carriages should be positioned in several planes, which complicates the construction of the arrangement.

The constructional complications are also materially aggravated by the necessity of using two rests for deburring the two edges of each band simultaneously.

To provide for efficient deburring, the moving band should be constantly kept taut, which calls for additional tensioning devices.

It is an object of the invention to eliminate the disadvantages described above.

It is another object of this invention to provide an arrangement for deburring the edges of a moving metal band which will efficiently remove burrs irrespective of band tension and position.

It is a further purpose of this invention to provide an arrangement for deburring the edges of a moving metal band which will be of simple construction and not require stationary installation.

It is a still further object of this invention to provide an arrangement for deburring the edges of a moving metal band into which it will be possible to readily and quickly fit a band engaged in a slitting or recolling machine.

With these and other objects in view, in an arrangement for deburring the edges of a moving metal band, comprising a frame mounted on which are tool holders which carry cutting tools and are adjustable for band width, guides for directing the band into the cutting zone and a mechanism for adjusting the cutting tools in relation to the height of the burrs, according to the invention the frame is made in the form of a yoke adapted to be mounted on the band so that the latter serves as a supporting element for the whole deburring arrangement, the frame and the band being capable of moving relatively to each other, and said frame is provided with a device which orientates the plane of the band in relation to the cutting tools and limits alteration of the band position in relation to the height of said guides.

Since the frame is made in the form of a yoke adapted to be mounted on the band, the deburring arrangement is enabled to be quickly fitted on the band or replaced by another arrangement preadjusted for the band width and burr height. Another benefit obtained by mounting the deburring arrangement on the band is that sufficient band tension in the cutting zone is given. Provision of the device for orientating the band plane in relation to the cutting tools enables the deburring arrangement, without interfering with the deburring operation, to follow the band as the position thereof changes, the frame and the band being capable of moving relatively to each other.

The device which orientates the plane of the band in relation to the cutting tools and limits alteration of the band position in relation to the height of the guides, comprises, according to one of its embodiments, two pairs of supporting rollers. The first pair of said rollers is located underneath the cutting tools for the purpose of orientating the plane of the band in relation to said cutting tools and taking up cutting forces, whereas the other pair of the rollers is located in the vicinity of the guides for the purpose of limiting alteration of the band position in relation to the height of said guides. The two rollers mentioned first are coplanar, parallel and positioned one after the other so that the cutting forces taken up by said rollers are applied between them. The two rollers mentioned second are positioned between the guides and form, in conjunction therewith, an opening for the band to pass.

This construction of said device provides for precision positioning of the band in the cutting zone and thereby enables burrs to be cut off from the band edges to the same height.

One feature of the invention consists in that the frame is made in two parts fitting one into the other. The first part of the frame carries said tool holders with the cutting tools, said guides for directing the band into the cutting zone and said mechanism for adjusting the tools in relation to the height of the burrs. The second part of the frame carries the first pair of the supporting rollers and one of the rollers from the second pair, its counterpart being mounted on the first part of the frame.

With this construction of the frame and location of the mechanisms thereon, it is possible to quickly assemble and disassemble the deburring arrangement and change the parts of the frame or the mechanisms on each part thereof.

Another feature of the invention consists in that the first part of the frame has two coplanar slots facing towards each other and is provided with retaining screws. Said slots are intended to receive the second part of the frame and the purpose of said retaining screws is to lock the second part of the frame in said slots. The second part of the frame has projections which bear against the first part of the frame and serve the purpose of locating the first pair of the supporting rollers underneath the cutting tools.

A further feature of the invention consists in that the cutting tools and the mechanism for adjusting said cutting tools in relation to the height of the burrs are mounted on the first part of the frame by means of a carrier which is pivoted thereto and supports a rocking lever pivoted to one of the carrier ends square therewith. The arms of the rocking lever mount said tool holders with the cutting tools, whilst the other end of the carrier mounts the mechanism for adjusting the cutting tools in relation to the height of the burrs.

Inasmuch as the cutting tools are mounted on the arms of the rocking lever pivoted to one of the ends of the carrier the other end of which mounts the mechanism for adjusting the cutting tools in relation to the height of the burrs said cutting tools can be simultaneously adjusted for position in relation to the band, which enables the burrs on both edges of the band to be cut to the same height. In addition, the installation of the tool holders with the cutting tools on the arms of the pivoted rocking lever makes it possible to bring the cutting tools in contact with the band edges simultaneously and with the same force, which makes for compactness of the deburring arrangement.

A further feature of the invention consists in that the tool holders with the cutting tools are made adjustable for the band width by providing the arms of the rocking lever with longitudinal slots wherein said tool holders are rotatably mounted, being equidistantly spaced from the axis of the pivot.

A still further feature of the invention consists in that the cutting tools may take the form of disk cutters, the latter being installed in the tool holders so that the axis of rotation of each of them is inclined in relation to the edge of the moving band at an angle other than 90° and makes an acute angle with the plane of the band, whereby disk cutters can be rotated by the moving band.

The invention is characterized in that said carrier is spring loaded against the first part of the frame to facilitate the setting of the deburring arrangement and the mounting thereof on the band to be deburred and also to protect the edges of the cutting tools from being damaged when the deburring arrangement is in a non-working position.

The invention is further characterized in that the travel of the deburring arrangement in the direction of band movement is limited by provision of a link articulated to either part of the frame and to any element which is stationary relatively to the moving band.

The arrangement for deburring the edges of a moving metal band, as constructed in accordance with the present invention, is compact, can be very quickly mounted on the band and ensures cutting off burrs on the edges of the band to equal height irrespective of band position and tension.

An embodiment of the arrangement for deburring the edges of a moving metal band will now be described by way of example with reference to the accompanying drawings in which:

FIG. 3 is a plan view diagrammatically showing the arrangement for deburring the edges of a moving metal band.

FIG. 5 is a diagrammatic layout of a coiled strip slitter equipped with the deburring arrangement in accordance with the invention.

Figure 1:
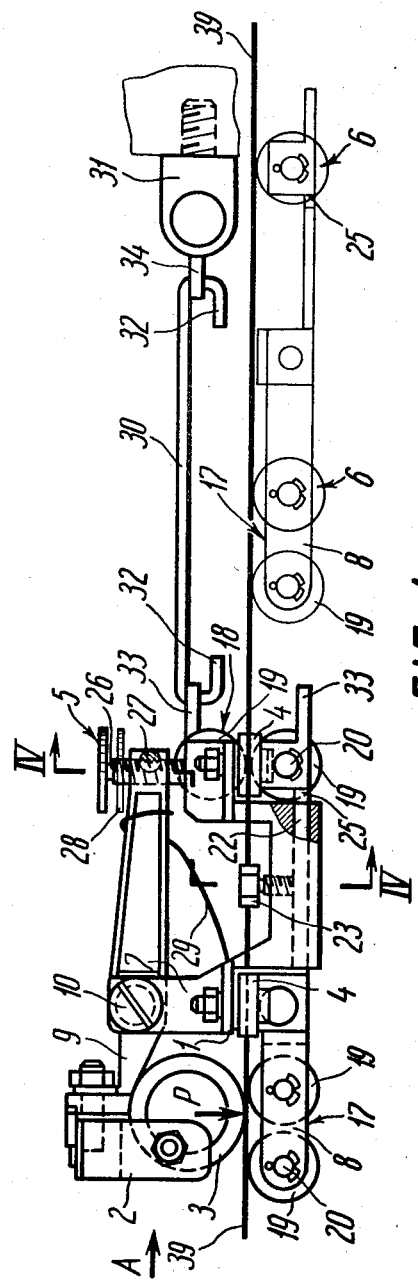
FIG. 1 is a side view diagrammatically showing the arrangement for deburring the edges of a moving metal band. constructed in accordance with the invention.

The arrangement for deburring the edges of a moving metal band comprises a frame 1 (FIG. 1) made in the form of a yoke, tool holders 2 with cutting tools 3, guides 4 made in the form of rollers and intended for directing the band into the cutting zone, a mechanism 5 for adjusting the cutting tools 3 in relation to the height of the burrs, a device 6 for orientating the plane of the band in relation to the cutting tools 3 and limiting alteration of the band position in relation to the height of the guides 4.

The frame 1 is made in the form of a yoke composed of two parts 7 and 8 fitting one into the other and is adapted to be mounted on the band so that the latter serves as a supporting element for the whole deburring arrangement, the frame and the band being capable of moving relatively to each other (the part 8 of the frame is shown separately from the part 7 thereof by a broken line in FIG. 1).

The part 7 of the frame mounts the guides 4 for directing the band into the cutting zone, the mechanism 5 for adjusting the cutting tools 3 in relation to the height of the burrs, and a carrier 9 which is attached to the part 7 of the frame by means of a pivot 10.

Figure 2:
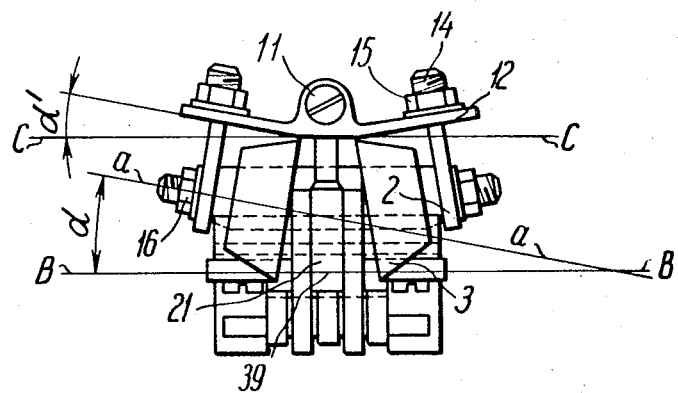
FIG. 2 is a view in the direction of the arrow A in FIG. 1.

One end of the carrier 9 mounts the mechanism 5 for adjusting the cutting tools 3 in relation to the height of the burrs, whilst the other end of the carrier mounts a rocking lever 12 which is positioned square to the carrier and is held to it by a pivot 11 (FIG. 2).

The arms of the rocking lever 12 are provided with longitudinal slots 13 (FIG. 3) wherein the tool holders 2 (FIG. 2) with the cutting tools 3 are rotatably mounted, being equidistantly spaced from the axis of the pivot 11.

Each tool holder 2 is enabled to rotate about its axis by provision of a threaded cylindrical end piece 14 which fits into the slot 13. A nut 15 is screwed on the end piece 14 to secure it in position. The tool holders 2 can be positioned in the rocking lever slots 13 (FIG. 3) at various distances from the axis of the pivot 11, which permits of adjusting the cutting tools 3 for the band width.

The cutting tools 3 may take the form of disk cutters secured to the tool holders 2 (FIG. 2) by nuts 16, said disk cutters being imparted motion by the moving band. To receive motion from the moving band, the disk cutters should be mounted on the tool holders 2 so that the axis $a$—$a$ about which each disk cutter rotates makes an acute angle $\alpha$ with the plane B of the moving band and is inclined in relation to the edges $b$—$b$ of the moving band at an angle $\beta$ (FIG. 3) other than 90° (the angle $\beta$ is shown between the band edge $b$—$b$ and the projection of the cutter axis $a$—$a$ into the plane in which the band is positioned).

The axis $a$—$a$ of the disk cutters (FIG. 2) is set at an acute angle $\alpha$ to the band plane B by positioning the arms of the rocking lever 12 at an acute angle $\alpha'$ with the plane C which is parallel to the band plane B and passes through the base of the rocking lever middle portion. Thus the angle $\alpha'$ is equal to the angle $\alpha$.

However, the method of setting the axis $a$—$a$ of the disk cutters at an acute angle $\alpha$ to the plane B of the moving band is not confined to the embodiment under consideration. Another method, for example, is to mount the tool holders 2 at an obtuse angle to the arms of the rocking lever 12.

In order to set the axis a—a of the disk cutters at an angle β (FIG. 3) other than 90° in relation to the edge b—b of the moving band, the tool holder 2 is rotated about its axis and secured in the slot 13 (FIG. 3) with the nut 15 (FIG. 2).

The device 6 which orientates the plane of the band in relation to the cutting tools 3 and limits alteration of the band position in relation to the height of the guides 4 comprises two pairs of supporting rollers 19 (FIG. 1) The first pair 17 is mounted on the second part 8 of the frame 1 and located underneath the cutting tools 3. This pair of the supporting rollers is designed to orientate the plane of the band in relation to the cutting tools 3 and to take up the cutting forces P. The two rollers 19 constituting the first pair 17 are coplanar, parallel and positioned one after the other so that the cutting forces P are applied between the roller shafts 20.

The second pair 18 is positioned between the guides 4, the rollers 19 constituting this second pair 18 being adapted to limit alteration of the band position in relation to the height of the guides 4. These two rollers 19 form in conjunction with the guides 4 an opening 21 (FIG. 2) for the band to pass. One of the rollers 19 from the pair 18 (FIG. 1) is mounted on the part 7 of the frame 1, whereas its counterpart is mounted on the part 8 of the frame 1. All the rollers 19 are rotatably mounted on the shafts 20 fitted in the frame and receive motion from the moving band.

The part 7 of the frame 1 has two coplanar slots 22 facing towards each other and is provided with retaining screws 23. The slots 22 receive the second part 8 of the frame 1 and the retaining screws 23 secure the part 8 of the frame 1 in the slots 22 by fitting into the holes 24 (FIG. 3) provided in the slots 22.

For the roller pair 17 to be located underneath the cutting tools 3, the part 8 of the frame 1 is provided with projections 25 (FIG. 1) which bear against the part 7 of the frame 1.

The mechanism 5 for adjusting the cutting tools 3 in relation to the height of the burrs consists of a screw 26 with a locknut 28 installed thereon. The screw 26 fits into a threaded hole 27 provided in the end of the carrier 9, the end of the screw 26 resting against the part 7 of the frame 1. When the screw 26 is turned in one or the other direction, it forces down or releases the end of the carrier 9 which, turning about the pivot 10, moves the cutting tools 3 towards or away from the moving band, thereby adjusting the cutting tools 3 for the height of the burrs.

The carrier 9 is loaded by a spring 29 against the first part 7 of the frame 1. One end of the spring 29 is attached to the part 7 of the frame 1, whereas the other end is freely engaged with one of the carrier arms, sliding over it as the carrier 9 is moved.

To limit the travel of the deburring arrangement in the direction of band movement, provision is made of a link 30 articulated to any of the parts of the frame 1 (in the embodiment under consideration the link is articulated to the part 7 of the frame 1) and any element 31 which is stationary in relation to the moving band (a beam or the frame of an associated machine may be used in the function of the stationary element 31). For the purpose the link 30 has curved ends 32 whilst the parts 7 and 8 of the frame 1 and the element 31 are provided with lugs 33 and 34 having holes 35 and 36 (FIG. 3) into which the curved ends 32 of the link 30 are engaged.

Figure 4:
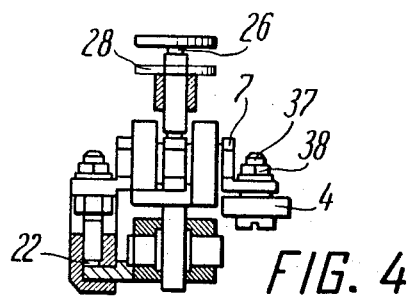
FIG. 4 is a section on the line IV—IV of FIG. 1.

The guides 4 are rollers freely mounted on shafts 37 (FIG. 4) and attached to the part 7 of the frame 1 by nuts 38.

According to the invention, the arrangement for deburring the edges of a moving metal band functions as follows:

Referring to FIG. 5, a steel strip is fed from a decoiler (not represented) to a rotary slitter 40. After the strip is slit into bands 39, the latter are fed through dividing rollers 41 to deburring arrangements 42 and thereafter to a coiler 43.

By provision of the dividing rollers 41 the bands 39 are put in a staggered attitude so that the deburring arrangements 42 can be put on each band 39.

Any number of bands 39 can be deburred, one deburring arrangement 42 being put on each band. Inasmuch as the deburring arrangements are not interconnected mechanically, they can be positioned in various planes irrespective of band tension and position.

Adjustment for the height of the burrs and the width of the band is effected on each deburring arrangement individually outside the slitting machine. After the adjustment is made, the frame 1 (FIG. 1) of the deburring arrangement 42 is taken apart by taking out the retaining screws 23 and removing the part 8 of the frame 1 from the slots 22 in the part 7 of the frame 1 (the position of the part 8 of frame 1 is shown by the broken line). Thereafter the band 39 is fitted between the guides 4 on the part 7 of the frame 1, the part 8 of the frame 1 is engaged into the slots 22 provided in the part 7 of the frame 1, the projections 25 bearing against said frame part, and the part 8 of the frame 1 is secured in the slots 22 by means of the retaining screws 23, the roller pair 17 being located underneath the cutting tools 3.

In this way the metal band 39 is placed in the opening 21 (FIG. 2) formed by the guides 4 (FIG. 1) and the roller pair 18 in conjunction with the cutting tools 3 and the roller pair 17, i.e. the band 39 is positioned between the parts 7 and 8 of the frame 1.

The deburring arrangement 42 should be positioned on the band 39 depending on which side of the band is burred. If the burrs are on the top side of the band, the deburring arrangement 42 should be installed so that it bears on the band through the cutting tools 3 and the roller 19 from the pair 18 which is mounted on the part 7 of the frame 1. If the burrs are on the underside of the band 39, the deburring arrangement 42 should be installed so that it bears on the band through the roller pair 17 and the roller 19 from the pair 18 which is mounted on the part 8 of the frame 1.

After each deburring arrangement 42 is installed on its associated band, it is connected to the stationary element 31 by means of the link 30. For the purpose the curved ends 32 of the link 30 are engaged into the hole 36 (FIG. 3) in the element 31 and into the hole 35 in the lug 33 provided on the part 7 or 8 of the frame 1. The links 30 differ in length and therefore the deburring arrangements 42 are set apart so that the bands 39 can be placed close to one another, which permits of materially reducing the overall dimensions of the slitting machine.

With the coiler 43 (FIG. 5) operating, the metal bands 39 move, whereas the deburring arrangements 42 remain stationary since they are each connected by their respective links 30 (FIG. 1) to the stationary elements 31. Thus the deburring arrangements 42 are held away from the stationary elements 31 at a distance equal to the length of the appropriate link 30 and can assume any attitude together with the bands 39.

During its movement, the band 39 is orientated in the deburring arrangement 42 in relation to the cutting tools by the guides 4 and by the roller pair 17. The roller pair 18 limits alteration of position of the band 39 in relation to the height of the guides 4.

During movement of the band the band edges b—b (FIG. 3) are in constant contact with the cutting tools 3, imparting motion thereto. The cutting tools 3 rotate and remove burrs from the edges b—b of the band 39 to the preset height.

Since the tool holders 2 with the cutting tools 3 are located on the arms of the rocking lever 12 mounted on the carrier 9, the cutting tools 3 are brought against the edges b—b of the band 39 simultaneously and with the same force, the cutting force P (FIG. 1) being applied between the shafts 20 of the roller pair 17 due to which the band 39 is given sufficient tension in the cutting zone and normal burr cutting conditions are provided.

To replace one deburring arrangement by another, the movement of the bands should be discontinued by stopping the coiler 43 (FIG. 5). Thereafter the retaining screws 23 (FIG. 1) are taken out and the part 8 of the frame 1 is removed from the slots 22 in the part 7 of the frame 1. Now another deburring arrangement can be fitted on the band or the part 7 or 8 of the frame 1 changed.

The cutting tools 3 are adjusted for the height of the burrs by turning the screw 26 in the required direction. Turning the screw 26 causes the carrier 9 to move about the pivot 10 due to which the rocking lever 12, which is pivoted to the other end of the carrier 9 and mounts the tool holders 2 with the cutting tools 3, sets said cutting tools 3 closer to or farther from the plane B (FIG. 2) of the band 39.

Adjustment of the cutting tools 3 for the width of the band 39 is effected by unscrewing the nuts 15 and shifting the tool holders 2 in the slots 13 (FIG. 3) so as to move the tool holders 2 by the same amount towards or away from the axis of the rocking lever pin 11. After the tool holders 2 are set in position, they are secured by screwing the nut 15 on the cylindrical end piece 14.

According to the invention, the deburring arrangement can be mounted on the band without taking the frame apart. For the purpose the end of the band should be inserted into the opening 21 (FIG. 2) and pulled through the guides 4 and between the roller pair 17 and the cutting tools 3.

I claim:

1. An arrangement for deburring the edges of a moving metal band comprising a frame made in the form of a yoke adapted to be mounted on the band so that the latter serves as a supporting element for the whole deburring arrangement, the frame and the band being capable of moving relatively to each other; tool holders mounted on said frame so that they can be adjusted for band width; burr cutting tools mounted in said tool holders; guides provided in said frame for the purpose of directing the band into the cutting zone; a mechanism for adjusting said cutting tools in relation to the height of the burrs, which mechanism is mounted on said frame; a device for orientating the band plane in relation to said cutting tools and limiting alteration of the band position in relation to the height of said guides, which device is also mounted on said frame.

2. An arrangement as claimed in claim 1, in which the device for orientating the band plane in relation to the cutting tools and limiting alteration of the band position in relation to the height of the guides comprises two pairs of supporting rollers, the first pair being located underneath the cutting tools for the purpose of orientating the band plane in relation to the cutting tools and taking up the cutting forces, and the second pair being located in the vicinity of the guides for the purpose of limiting alteration of the band position in relation to the height of said guides, which first pair has its rollers located coplanar, parallel and one after the other so that the cutting force taken up by these rollers is applied between them, and which second pair has its rollers located between the guides to form in conjunction therewith an opening for the band to pass.

3. An arrangement as claimed in claim 2, in which, for the purpose of mounting the arrangement on the band, the frame is made in two parts fitting one into the other, the first part of the frame mounting said tool holders with the cutting tools, the guides to direct the band into the cutting zone and the mechanism for adjusting the cutting tools in relation to the height of the burrs, and the second part of the frame mounting the first pair of supporting rollers and one of the supporting rollers belonging to the second pair, its counterpart being mounted on the first part of the frame.

4. An arrangement as claimed in claim 3, in which the first part of the frame has two coplanar slots facing towards each other and is provided with retaining screws, which slots are intended to receive the second part of the frame and which retaining screws lock the second part of the frame in said slots, said second part of the frame being provided with projections which bear against the first part of the frame and serve the purpose of locating the first pair of supporting rollers underneath the cutting tools.

5. An arrangement as claimed in claim 3, in which the cutting tools and the mechanism for adjusting said cutting tools in relation to the height of the burrs are mounted on the first part of the frame by means of a carrier which is pivoted thereto and supports a rocking lever pivoted to one of the ends of said carrier square therewith, the arms of the rocking lever mounting said tool holders with the cutting tools, whilst the other end of the carrier mounts said mechanism for adjusting the cutting tools in relation to the height of the burrs.

6. An arrangement as claimed in claim 5, in which the tool holders with the cutting tools are made adjustable for band width by providing the arms of the rocking lever with longitudinal slots wherein said tool holders are rotatably mounted, being equidistantly spaced from the axis of the pivot.

7. An arrangement as claimed in claim 6, in which the cutting tools may take the form of disk cutters, the latter being installed in the tool holders so that the axis of rotation of each disk cutter is inclined in relation to the edge of the moving band at an angle other than the right angle and makes an acute angle with the plane of the band.

8. An arrangement as claimed in claim 5, in which the carrier is spring loaded against the first part of the frame.

9. An arrangement as claimed in claim 3, which is prevented from moving in the direction of band movement by provision of a link articulated to any part of the frame and to any element which is stationary in relation to the moving band.

* * * * *